Dec. 16, 1947.  J. A. BASSETT ET AL  2,432,854
APPARATUS FOR CLEANING AND COATING WIRE
Filed April 16, 1945  2 Sheets-Sheet 1

INVENTORS
J.A. BASSETT
A.S. NIEMIEC
BY Harry R. Duft
ATTORNEY

Dec. 16, 1947.  J. A. BASSETT ET AL  2,432,854
APPARATUS FOR CLEANING AND COATING WIRE
Filed April 16, 1945  2 Sheets-Sheet 2
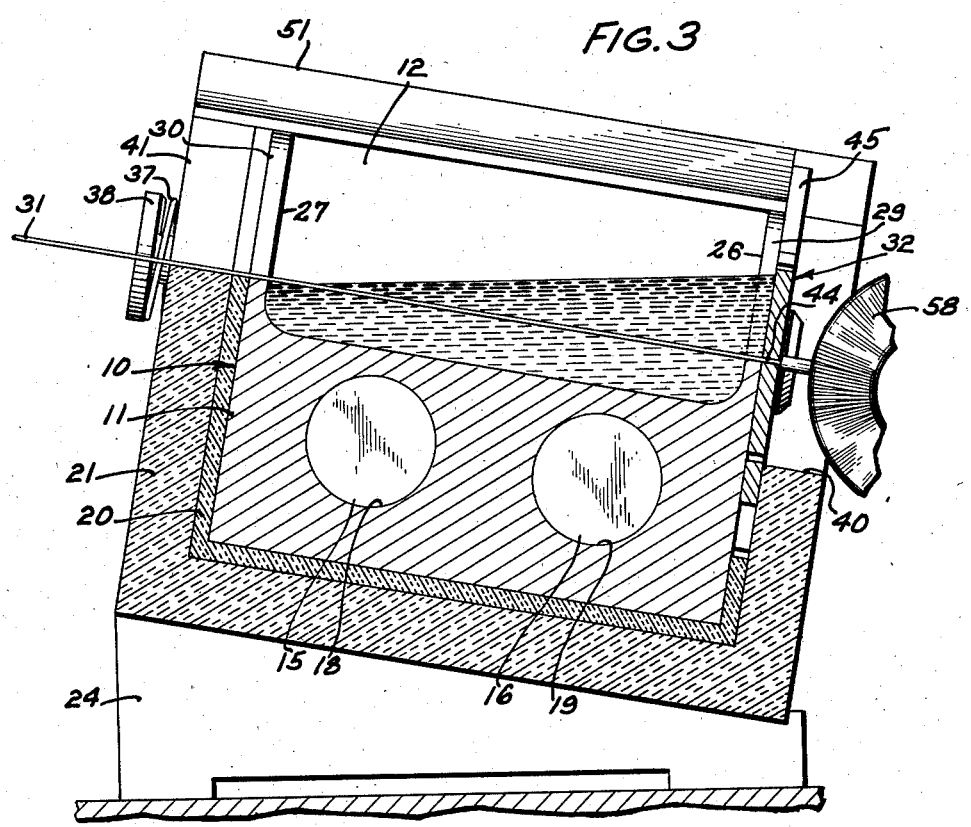
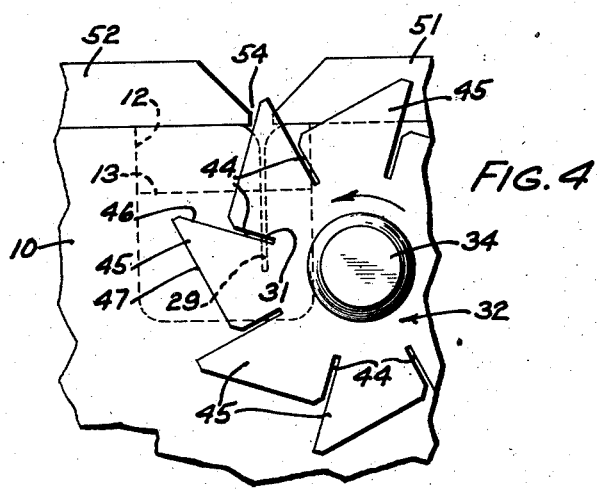
INVENTORS
J. A. BASSETT
A. S. NIEMIEC
BY
ATTORNEY Patented Dec. 16, 1947

2,432,854

UNITED STATES PATENT OFFICE 2,432,854

APPARATUS FOR CLEANING AND COATING WIRE

John A. Bassett, Westchester, and Andrew S. Niemiec, Cicero, Ill., assignors to Western Electric Company, Incorporated, New York, N. Y., a corporation of New York Application April 16, 1945, Serial No. 588,698

9 Claims. (Cl. 91—12.5)

1

This invention relates to an apparatus for cleaning wire and more particularly to an apparatus for removing film type insulation on wire.

Because of the tenacious adherence of certain types of insulation such as "Formex" insulation to a wire on which it is coated, it is difficult to remove the coating from the wire by mechanical means. In removing this insulation from wire, as for instance, lead wires of electrical devices such as loading coils, it has been the practice in one method of cleaning the wire to dip the wire in a molten solder bath. However, a dross or scum accumulates on the top of the bath which adheres to the wire as it is withdrawn leaving the end of the wire unsuitable for soldering without further cleaning.

An object of this invention is to provide an effective and efficient apparatus for cleaning coated wire.

In one embodiment of this invention of an apparatus for cleaning wire, a container is provided for holding a supply of molten solder and has a wall with a vertical slot therein extending below the solder level through which a wire may be moved downward into the molten solder to permit the hot solder to heat and remove the insulated coating from the wire. A disc is pivotally mounted on the solder pot to substantially close the vertical slot and prevent the loss of solder therethrough and is provided with an open ended angular slot, the open end of which is aligned with the vertical slot above the solder level to receive a wire, after which the angular slot is moved across the vertical slot to progressively uncover a restricted portion thereof to accommodate the wire as it is moved into the solder later to be withdrawn by a longitudinal movement of the wire beneath the surface of the solder.

The invention will be more fully understood from the following description taken in connection with the accompanying drawings illustrating a preferred embodiment thereof, in which Fig. 1 is a plan view of the apparatus with portions of the cover broken away;

Fig. 3 is a vertical longitudinal section taken on the line 3—3 of Fig. 2 and showing a wire immersed in the solder, and Fig. 4 is a fragmentary front view of a portion of the apparatus.

Figure 1:
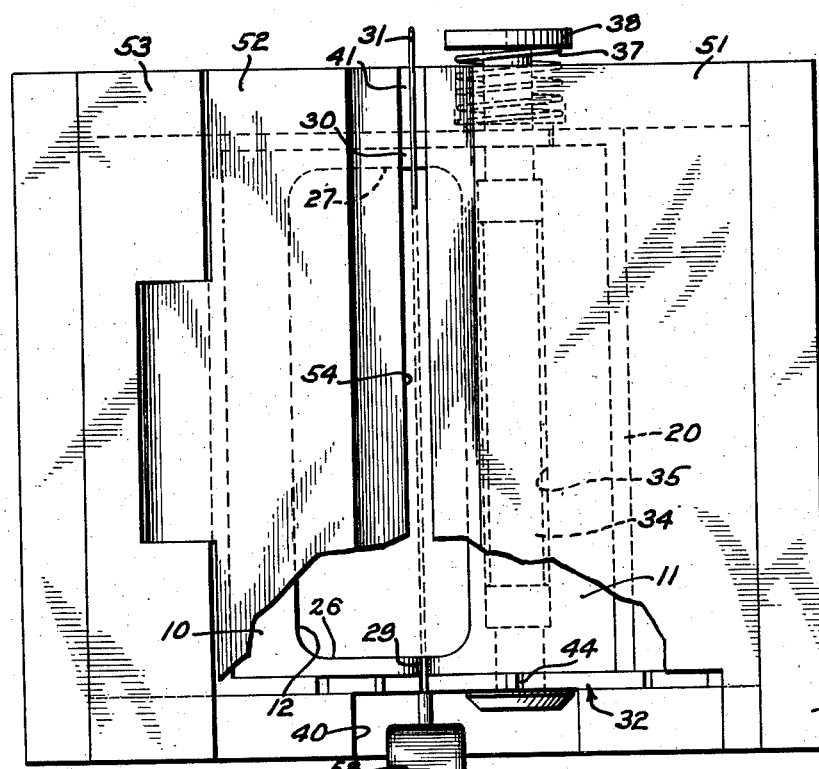

In the cleaning of coated wire preparatory to soldering, use is made of molten solder maintained at a fairly high temperature into which that portion of the wire which is to be cleaned is immersed. When cleaning "Formex" wire the

2 temperature is maintained at 970° F. or above. The action of the heated solder will cause the coating of insulation thereon to melt and be removed from the wire and to rise to the surface of the solder. A coating of solder adheres to the wire after the coating of insulation is removed therefrom. The present apparatus facilitates the practice of this method of cleaning and tinning wire.

Referring now to the drawings, the apparatus is shown as comprising a container or solder pot 10 in the form of a rectangular cast iron block 11 having an elongated recess 12 for holding a supply of molten solder 13. A pair of electrical heaters 15 and 16 are provided for heating the solder and are positioned in apertures 18 and 19 in the solder pot 10. The solder pot is enclosed on its four sides and bottom with a layer of heat insulation 20 and an outer wall of heat insulation 21 and is mounted in an inclined position on supporting members 23 and 24.

Figure 2:
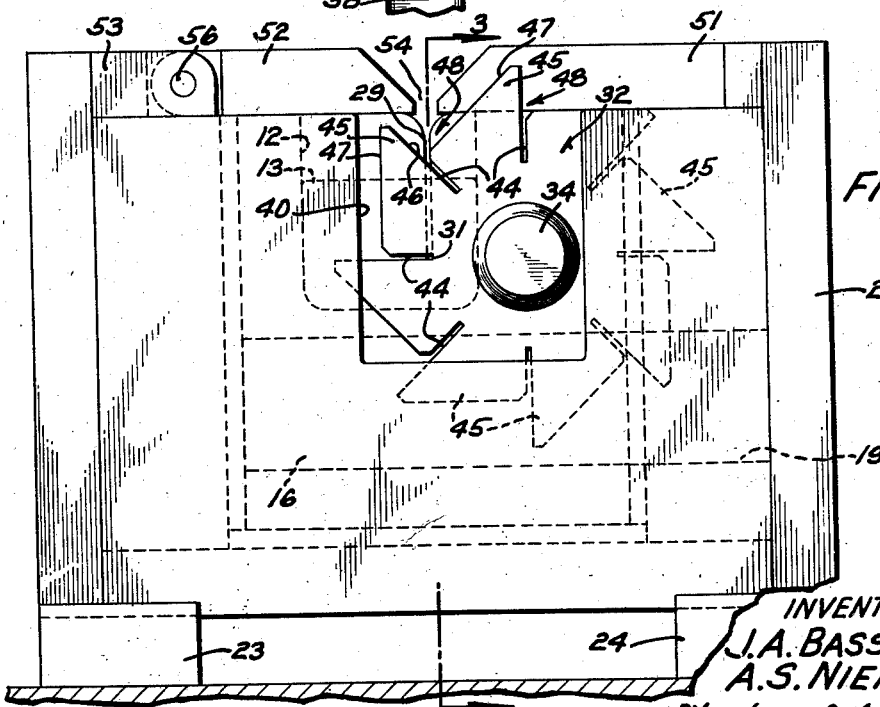
Fig. 2 is a front elevation of the apparatus.

The front and rear walls 26 and 27 of the solder pot are each provided with an opening 29 and 30, respectively, in the form of an elongated vertical slot extending downward from the top edges of the walls. The slot 30 of the wall 27 extends to a point above the surface level of the solder 13 and the slot 29 in the wall 26 extends to a point below the surface level of the solder, as illustrated in Fig. 3. The slots 29 and 30 are aligned to permit a wire as indicated at 31 (Fig. 3) to be moved downward into the molten solder 13. To prevent the flow of solder through the slot 29, a closure member 32 in the form of a flat disc is provided to substantially cover that portion of the slot below the solder level. The disc 32 is rotatable and is secured to a shaft 34 journalled in a bore 35 of the block 11 located adjacent to and parallel to the recess 12 (see Fig. 2). The disc is urged against the wall 26 of the solder pot by a spring 37 interposed between a shoulder or flange 38 on the shaft 34 and a recessed portion of the wall 21 to tightly close the slot 29. A portion of the layer of insulation 20 adjacent the wall 26 of the solder pot is cut away to accommodate the disc 32 and the wall 21 adjacent the disc 32 is cut away at 40 to provide clearance for the reception of the wire being cleaned and the electrical devices as, for example, the wire 31 and coil 58. The layers of insulation 20 and 21 are also slotted at 41 adjacent to and in alignment with the slot 30 in the wall 27 to permit the downward movement of the wire 31.

The disc 32 is star shaped and has a number of equally spaced radially disposed slots 44 and an equal number of projecting arms 45 bounded by the edges 46 and 47. The edges 46 and 47 of adjacent arms converge to form enlarged openings or throats 48 connecting with the open end of the slots 44. The open end of a slot 44 is adapted to be aligned with the vertical slot 29, as shown in Fig. 1, to receive a wire which upon being moved down through the slot 29 engages the edge 46 of the arm 45 and rotates the disc 32 about its center and also moves in the slot 44 toward the closed end thereof. The slot 44 is disposed at an angle with respect to the vertical slot 29 and as it moves relative thereto, it progressively uncovers a small portion of the slot 29 sufficient to receive and accommodate the wire 31 as the wire moves downwardly into the solder. The movable angular slot 44 in cooperation with the slot 29 forms a movable passageway movable from above to below the surface level of the solder and which may receive a wire therein and permit its downward movement into the pool. The relation of the slots 44 are such that when the wire 31, in passing downward through the slot 29 to the lower end thereof, engages the edge 46 of an arm 45 and moves the disc 32 and the slot 44 to the position shown in Fig. 1, so that the open end of the following slot 44 is in alignment with the upper portion of the slot 29 to receive a wire for a succeeding operation.

To confine the heat to the apparatus, cover sections 51, 52 and 53 of heat insulating material are provided to substantially cover the apparatus. The sections 51 and 52 are separated to provide a slot 54 in alignment with the slots 29 and 30 to permit passage of a wire therethrough. The section 52 is pivoted at 56 to permit its being turned upward to provide access to the recess 12 for removing the waste formex insulating material from the solder pool and for replenishing the supply of solder.

In using the apparatus to clean and tin wire, as, for instance, the lead wire of a loading coil 58 preparatory to its being assembled on its mounting base, the wire is positioned in vertical alignment with the slots 29 and 30 of the solder pot and moved downward to the bottom end thereof and into the solder 13. The wire in passing downwardly through the slot 29 engages and rotates the disc 32 to move a slot 44 angularly across the slot 29 which permits the downward movement of the wire while the disc over-lies and effectively closes the slot 29 below the surface level of the solder 13. The lead wire 31 may be long to permit the operator to hold it to facilitate the handling thereof. The wire may be moved longitudinally within the pool of solder to adjust the coil and wire to a predetermined position relative to the solder 31 so that the lead wire will be cleaned and tinned at a definite position relative to the coil 58. The disc 32 may serve as a stop member for gauging the position of the coil 58 and wire 31. If the portion of wire to be cleaned and tinned is long, successive portions thereof may be cleaned and tinned by moving the wire longitudinally through the pool of solder 12. After the wire has been left in the solder for the length of time necessary to clean and tin the wire, it may be withdrawn axially to the right, as shown in Fig. 3, through the restricted opening formed by the intersection of the slots 29 and 44. The solder is effectively sealed off by the disc 32 and will not flow through the restricted opening left after the removal of the wire therefrom.

The "Formex" insulation, as previously mentioned, when removed from the wire by the action of the molten solder, will rise to the top of the solder and remain there until removed. As more wire is cleaned the amount of waste will increase and form a coating on the surface of the solder, which coating would adhere to the wire if the wire were removed therethrough after the cleaning operation. It is an important feature of this invention to remove the cleaned wire from the solder in a perfectly clean condition which is accomplished by withdrawing the wire from the solder at a point below the surface level of the solder.

What is claimed is:

1. An apparatus for cleaning coated wire comprising a container for a supply of molten material having a wall provided with an aperture extending above and below the surface level of said material, and a movable member cooperating with said wall to substantially close said aperture and provide a smaller aperture movable from above to below the surface level of said molten material for carrying a strand inserted therein beneath the surface of said material.

2. An apparatus for cleaning coated wire comprising a container for a supply of molten material and having a wall provided with an opening extending above and below the surface level of the molten material, movable means for closing said opening and preventing said molten material from flowing therethrough, said means having an opening therein a portion of which is alignable with a portion of said opening in said wall and cooperates with said opening in said wall to provide a restricted passageway movable from above to below said level of the molten material for carrying a strand inserted therein beneath the surface of said material.

3. An apparatus for cleaning coated wire comprising a container for a supply of molten material having a wall provided with a slot extending above and below the surface level of said molten material, a movable member cooperating with said wall for closing a portion of said slot to prevent said molten material from flowing therethrough, said movable member having a slot therein intersecting the slot in the wall to provide a restricted passageway movable from above to below said surface level of the molten material for carrying a strand inserted therein beneath the surface of said material, and means for guiding said movable member.

4. An apparatus for cleaning coated wire comprising a container for a supply of molten material having a wall provided with an opening extending below the surface level of the solder, a pivoted member for closing a portion of said opening and preventing the material from flowing therethrough, said member having a slot therein cooperating with the opening in said wall to form a restricted movable passageway for carrying a strand inserted therein beneath the surface of said material, and means for pivotally mounting said member on said container.

5. An apparatus for cleaning coated wire comprising a container for a molten supply of material having a wall provided with an aperture extending above and below the surface level of said material, a rotatable member for substantially closing said opening to prevent the molten material from flowing out therethrough, said rotatable member being provided with a plurality of spaced indentations for successively cooperating with said aperture in said wall to form restricted passageways movable from above to below the surface of said material for carrying a strand inserted therein beneath the surface of said material, and means for mounting said rotatable member.

6. An apparatus for cleaning coated wire comprising a container for a molten supply of material having a wall provided with a slot extending below the surface level of said material, a pivoted member engaging said wall and covering said slot to prevent the molten material from flowing therethrough, said member having a slot therein disposed at an angle and movable relative to said slot in the wall to intersect said slot in the wall and progressively uncover a restricted portion thereof to permit a strand inserted therein to be moved into said molten material, and means for pivotally mounting said movable member.

7. An apparatus for cleaning coated wire comprising a container for a supply of molten material having a wall provided with a slot extending below the surface level of said material, a rotatable member engaging said wall and covering a portion of said slot to prevent the molten material from flowing therethrough and having a plurality of spaced slots therein, said slots being movable angularly across said slot in said wall to progressively uncover a restricted portion of said slot in said wall to carry a strand inserted therein beneath the surface of said material, and means for rotatably supporting said member in engagement with said wall.

8. An apparatus for cleaning coated wire comprising a container for a supply of molten material having a wall provided with a slot therein extending above and below the surface level of said material, a rotatable disc engaging said wall for closing a portion of said slot to prevent said material from flowing therethrough and having a plurality of spaced inwardly directed slots therein successively movable angularly across the slot in said wall to progressively uncover a restricted portion thereof for receiving a strand therein and permitting its movement into said molten material, means engageable by the strand for rotating said disc as the strand is moved into the molten material, and means for rotatably supporting said disc in engagement with said wall.

9. An apparatus for cleaning coated wire comprising a container for a supply of molten material having a wall provided with an open ended slot extending below the surface level of said material, a rotatable disc overlying said slot and cooperating with said wall for effectively closing said slot to prevent said material from flowing therethrough, said disc having its axis of rotation offset laterally with respect to said slot and having a plurality of spaced open ended radial slots therein angularly movable across the slot in said wall to progressively uncover a small portion thereof for carrying a strand inserted therein beneath the suface of said material, and resilient means for urging said disc against said slot in said wall.

JOHN A. BASSETT.
ANDREW S. NIEMIEC.

REFERENCES CITED

The following references are of record in the file of this patent:

UNITED STATES PATENTS

| Number | Name | Date |
| --- | --- | --- |
| 2,372,248 | Bouton | Mar. 27, 1945 |
| 523,093 | Whalen | July 17, 1894 |
| 1,803,951 | Thoma | May 5, 1931 |
| 1,558,549 | Johnston | Oct. 27, 1925 |